United States Patent
Packard

(10) Patent No.: US 10,021,858 B1
(45) Date of Patent: Jul. 17, 2018

(54) ANIMAL WARMING ENCLOSURE

(71) Applicant: Marvin L. Packard, Springfield, CO (US)

(72) Inventor: Marvin L. Packard, Springfield, CO (US)

(*) Notice: Subject to any disclaimer, the term of this patent is extended or adjusted under 35 U.S.C. 154(b) by 0 days.

(21) Appl. No.: 15/217,999

(22) Filed: Jul. 23, 2016

(51) Int. Cl.
*A01K 1/00* (2006.01)
*A01K 13/00* (2006.01)

(52) U.S. Cl.
CPC .......... *A01K 13/001* (2013.01); *A01K 1/0035* (2013.01); *A01K 1/0076* (2013.01)

(58) Field of Classification Search
CPC ........ A01K 13/001; A01K 1/03; A01K 1/035; A01K 1/00; A01K 1/0035; A01K 1/008
See application file for complete search history.

(56) References Cited

U.S. PATENT DOCUMENTS

| | | | | |
|---|---|---|---|---|
| 5,669,332 A | * | 9/1997 | Riley | A01K 1/0613 119/724 |
| 6,425,347 B1 | * | 7/2002 | Bogner | A61D 3/00 119/315 |
| 2005/0241593 A1 | * | 11/2005 | Kaura | A01K 1/0035 119/496 |
| 2007/0245973 A1 | * | 10/2007 | Huisinga | A01K 41/00 119/300 |
| 2010/0132624 A1 | * | 6/2010 | Ferrer | A01K 1/0047 119/500 |
| 2010/0319627 A1 | * | 12/2010 | Cauchy | A01K 1/0236 119/500 |

* cited by examiner

*Primary Examiner* — Monica L Williams
(74) *Attorney, Agent, or Firm* — Paul R. Martin

(57) ABSTRACT

An animal warming enclosure which is suitable for enclosing large animals, such as newborn calves, and protecting them during inclimate weather. The enclosure can be mounted on a vehicle, such as a truck, and the animal will be transported while other chores are completed. The animal will remain warm and can be returned to an appropriate location, such as a barn, when the chores are completed. The enclosure is fluidically connected to the exhaust system of the vehicle so that warm exhaust is used to provide heat for the enclosure.

3 Claims, 4 Drawing Sheets

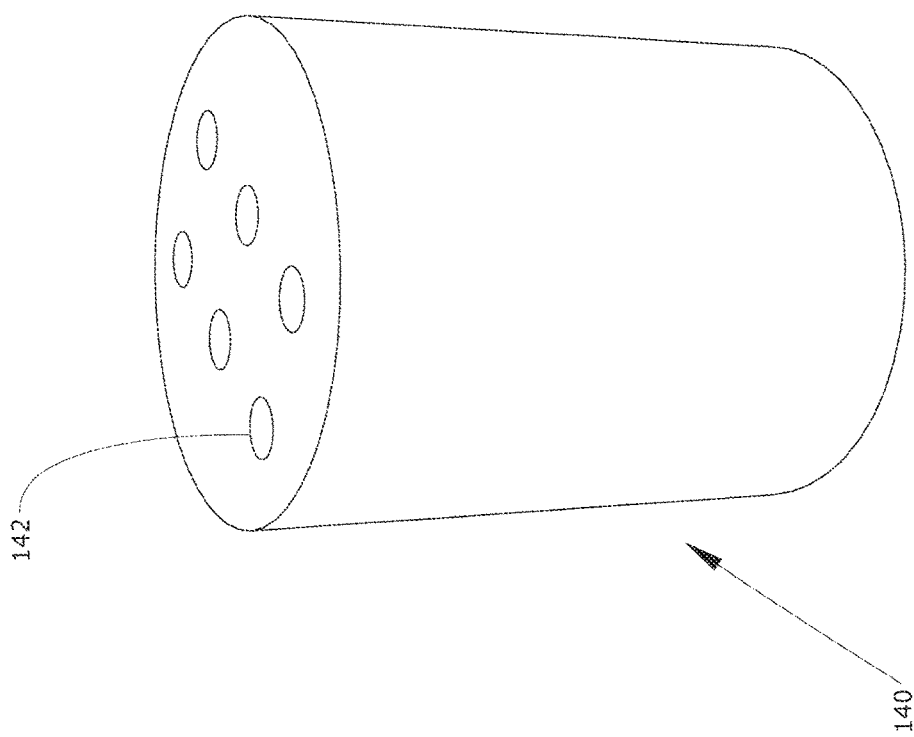

10,021,858 B1

ANIMAL WARMING ENCLOSURE

TECHNICAL FIELD OF THE INVENTION

The present invention relates to the general art of animal husbandry, and to the particular field of protecting new born animals from cold weather.

BACKGROUND OF THE INVENTION

When newly born calves are born in the winter often times the mother cow is unable to keep the calf sufficiently warm causing the calf to die. As a result, calf warming devices have been made where, upon the birth of a calf, the calf is placed within the calf warming device to keep warm during the initial hours of its life until the calf is able to survive in the outside environment.

Many problems are associated with these calf warming machines. For example, these calf warming machines have a two-step process for warming the calf, the first of which involves drying the calf. However, drying a calf is unsatisfactory because to dry the calf air must be blown onto the calf and this blowing air actually cools and consequently endangers the calf.

Another problem associated with calf warming machines is that when the calf is placed in the device the mother cow can neither see nor smell the calf such that when the calf finally emerges from the calf warming device the mother cow will not recognize the calf as its own. Therefore, the mother cow will refuse to feed and take care of the calf as its own. Another problem is that these machines are difficult and time consuming to clean. This limits the amount of calves that can be attended to by veterinarians using the machine.

An additional problem exists in that calf warming devices and power sources are not portable. Specifically, often a mother cow will not be willing to move from the spot where her water breaks to nurse and tend to the baby calf. As a result there is a need to have a calf warming machine that can be transported to the place the mother cow's water breaks.

Therefore, it is a principal object of the present invention to provide a calf warming device that improves efficiency in warming a calf.

SUMMARY OF THE INVENTION

The above-discussed disadvantages of the prior art are overcome by a warming enclosure which is located outside of a land vehicle. The warming enclosure is located adjacent to the exhaust pipes of the vehicle and is heated by heat conducted to the enclosure from the exhaust pipes via contact between the exhaust pipes and the walls of the enclosure. The enclosure is especially useful for transporting animals, such as baby calves. The unit embodying the present invention saves a newborn baby calf from freezing to death.

With the unit of the present invention, it is possible to warm a calf up while driving around to check the rest of the cattle, or do other chores. If a baby calf has been born in below-freezing temperatures, the baby calf can be placed into the unit of the present invention, and chores, such as checking on the rest of the cattle, can be completed and then return later to either leave the calf or transfer it to the warm box when going to a barn. The unit of the present invention provides a place to put a cold baby calf in to warm up instead of putting it in a vehicle.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 shows a fluid drain unit used in the warming device.

DETAILED DESCRIPTION OF THE INVENTION

Figure 1:
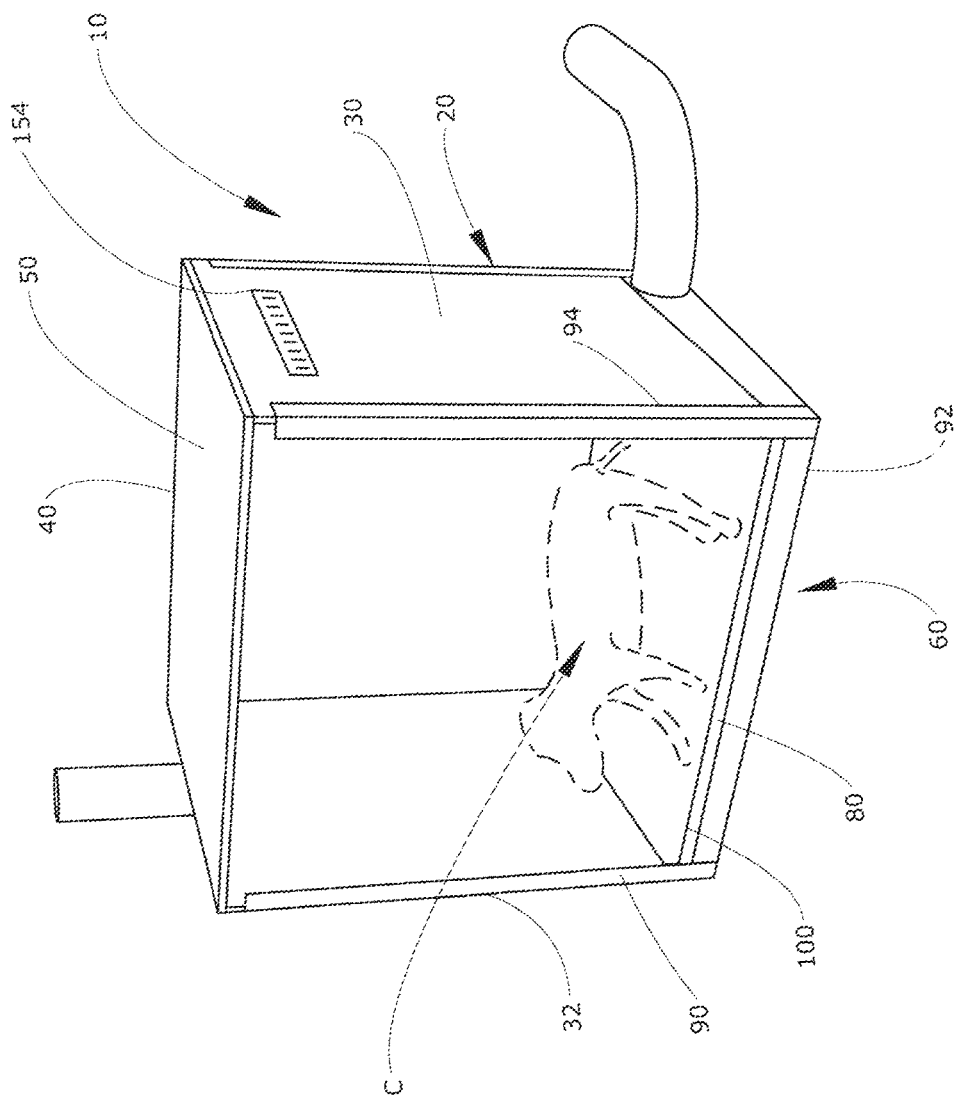
FIG. 1 shows a warming device embodying the present invention.
Figure 2:
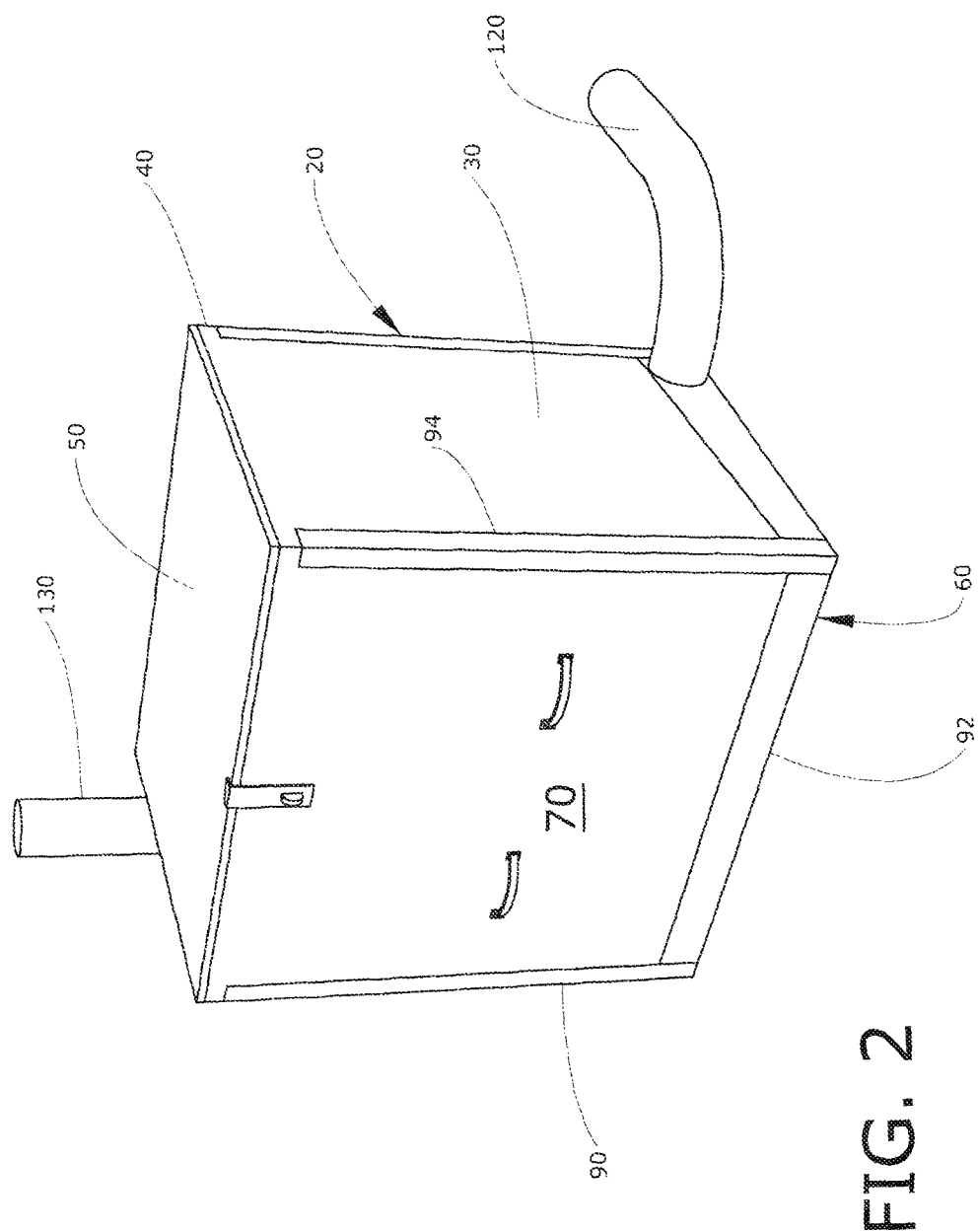
FIG. 2 shows the interior of the warming device.

Referring to the figures, it can be understood that the present invention is embodied in a warming unit 10 that can be used to transport large animals, such as a new-born calf C, without requiring the animal to be placed inside a vehicle. Unit 10 includes a body 20 that is easily mounted on a vehicle, such as a truck or tractor or other such vehicle. Body 10 includes two side walls 30 and 32, a rear wall 40, a top wall 50 and a bottom wall 60. A door 70 covers a front opening 80 of the body, and the body has a hollow interior. The body includes channel elements, 90, 92 and 94 which are located on the edges of the body. Door 70 slides into and out of the channels defined by these channel elements to be movable between an opening-covering position such as shown in FIG. 1 to an opening-uncovering position which will open the interior of the body as indicated in FIG. 2. The body is hollow and defines an interior 100 which is sized and shaped to safely and comfortably accommodate an animal, such as a newborn calf when the door is closed. It is also noted that the door fits snugly onto the body, but leaves some space for ventilation into and out of interior 100.

Figure 3:
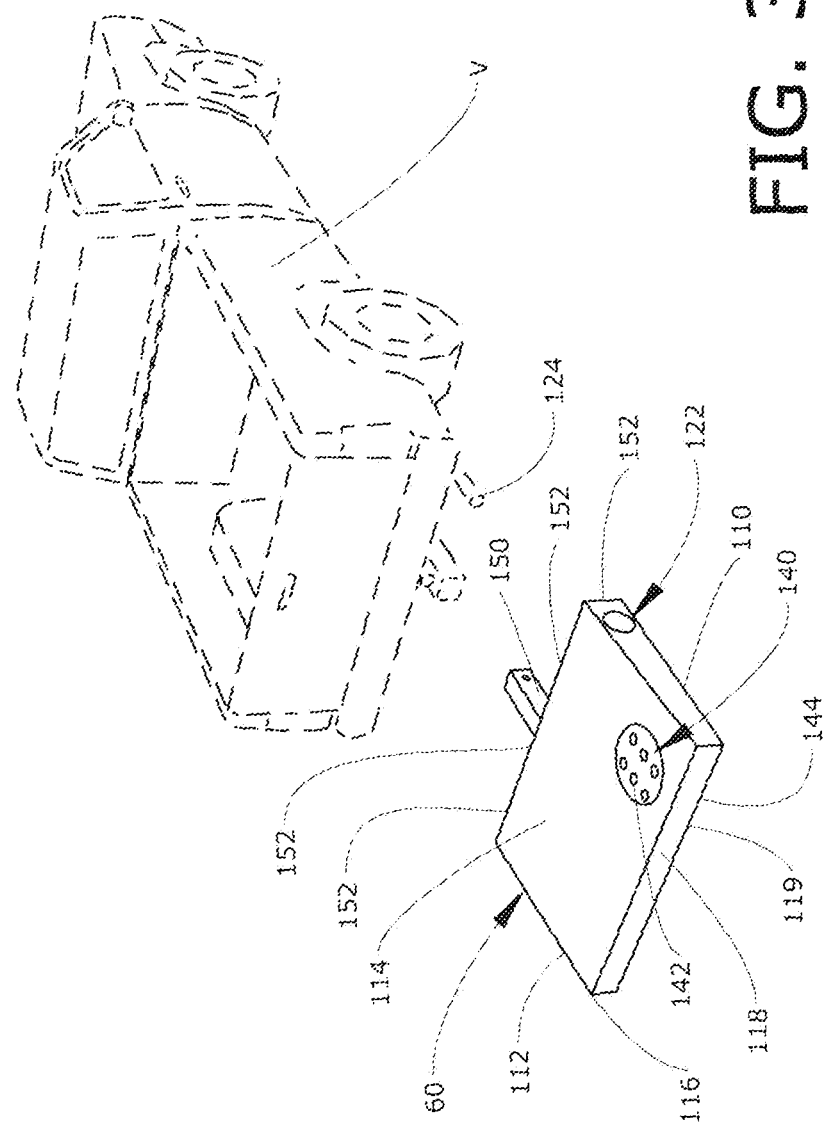
FIG. 3 shows the bottom floor of the warming device.

As can be understood from the teaching of FIGS. 2 and 3, bottom wall 60 is hollow and has two side walls 110 and 112, a rear wall 114, a top wall 116, a bottom wall 118, and a front wall 119. An inlet conduit 120 via in inlet port 122 fluidically connects an exhaust pipe 124 associated with a vehicle V carrying the unit to the interior of the hollow bottom wall so that hot exhaust from the vehicle is conducted into that interior. An exhaust conduit 130 fluidically connects the interior of the hollow bottom wall to the environment to conduct exhaust from the interior of the body to the environment. Of course, the bottom wall is securely sealed so that exhaust fumes do not enter the interior of the body. Top wall 116 of the bottom wall is formed of material that readily transfers heat from the interior of the hollow bottom wall to the interior of the body while remaining impervious to exhaust fumes.

A drain unit 140, shown in FIGS. 3 and 4, is located in the bottom wall 116 for conducting condensation and other fluids out of the body. Drain unit 140 includes a top inlet port unit 142 and an outlet port 144 defined in bottom wall 118 and an exhaust-gas impervious conduit 143 fluidically connecting inlet port 142 to outlet port 144 to conduct fluid out of the body interior while maintaining the imperviousness of the unit to exhaust fumes migrating into the interior of the body. Bottom wall 60, like drain unit 40, is also formed of vehicle exhaust-gas impervious material such as metal or ceramic.

A support unit mounts unit 10 to the vehicle, and includes a support bar 150 that is connected at one end thereof to body 20 and at the other end thereof to a suitable location on the vehicle V, such as a truck, a tractor or the like. It is noted that the vehicle is indicated in FIG. 3 by a box to illustrate that the vehicle can be any suitable vehicle.

An optional feature of my invention is the provision of ventilation holes 152 in the front wall of box 60, as shown in FIG. 3, in order to allow condensation to escape therefrom. Additionally, as shown in FIG. 1, an adjustable vent 154 can be installed near the top of side wall 30. Both of these features are optional.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A system for transporting animals comprising:
   a body which includes
      a hollow bottom wall, the bottom wall being formed of exhaust-gas impervious material,
      a top wall,
      a rear wall, and
      two side walls;
   an interior space defined by the walls of the body, an animal being located in the interior space of the body when the body is in use;
   a door movably mounted on the body, the door being movable between an interior space covering position and an interior space uncovering position;
   the hollow bottom wall including
      a top wall,
      a rear wall,
      a front wall,
      first and second side walls,
   an interior chamber defined by the walls of the hollow bottom walls;
   a motor vehicle exhaust system;
   an inlet conduit including
      a first end fluidically connected to the motor vehicle exhaust system, and
      a second end fluidically connected to the first side wall of the hollow bottom;
   an outlet conduit including
      a first end fluidically connected to the second side wall of the hollow bottom, and
      a second end located outside the interior chamber of the hollow bottom;
   a support unit for supporting the body on the motor vehicle, the support system including a support bar securely mounted on the rear wall of the hollow bottom wall; and
   a drain unit located in the hollow bottom wall, the drain unit including an inlet port defined in the top wall of the hollow bottom wall, an outlet port and a conduit fluidically connecting the drain inlet port to the drain outlet port, the drain unit being formed of exhaust-gas impervious material.

2. The enclosure defined in claim 1 further including channel defining elements on the body which slid ably accommodates the door.

3. A system for transporting animals comprising:
   a motor vehicle having an exhaust system;
   a body which is sized to accommodate large animals, such as a calf, and which includes
      a hollow bottom wall, the bottom wall being formed of exhaust-gas impervious material,
      a top wall,
      a rear wall, and
      two side walls;
   an interior space defined by the walls of the body, an animal being located in the interior space of the body when the body is in use;
   a door movably mounted on the body, the door being movable between an interior space covering position and an interior space uncovering position;
   the hollow bottom wall including
      a top wall,
      a rear wall,
      a front wall,
      first and second side walls,
   an interior chamber defined by the walls of the hollow bottom walls;
   a motor vehicle exhaust system;
   an inlet conduit including
      a first end fluidically connected to the motor vehicle exhaust system, and
      a second end fluidically connected to the first side wall of the hollow bottom;
   an outlet conduit including
      a first end fluidically connected to the second side wall of the hollow bottom, and
      a second end located outside the interior chamber of the hollow bottom;
   a support unit for supporting the body on the motor vehicle, the support system including a support bar securely mounted on the rear wall of the hollow bottom wall; and
   a drain unit located in the hollow bottom wall, the drain unit including an inlet port defined in the top wall of the hollow bottom wall, an outlet port and a conduit fluidically connecting the drain inlet port to the drain outlet port, the drain unit being formed of exhaust-gas impervious material.

* * * * *